Dec. 25, 1962 T. B. BOJAKO ET AL 3,070,378
ANTI-FRICTION ROTARY SEAL
Filed Oct. 14, 1960
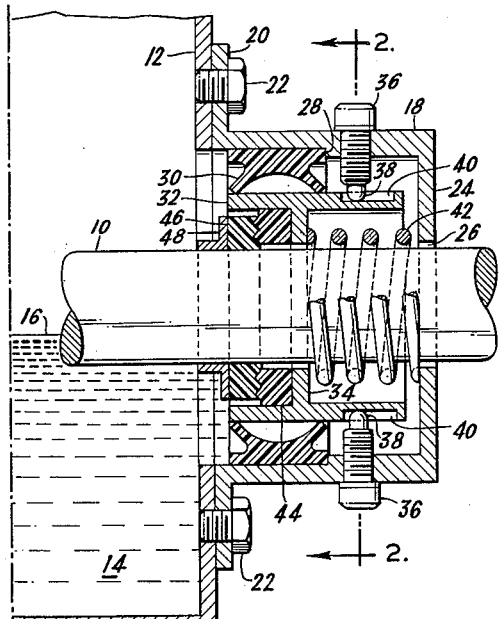
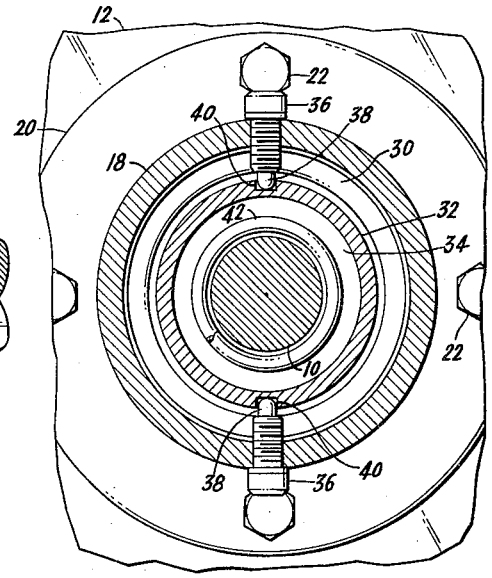
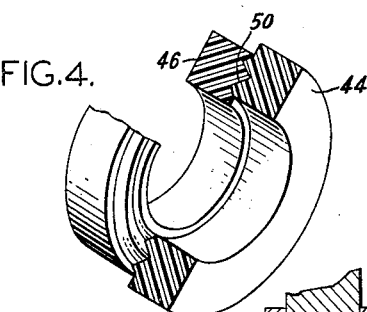
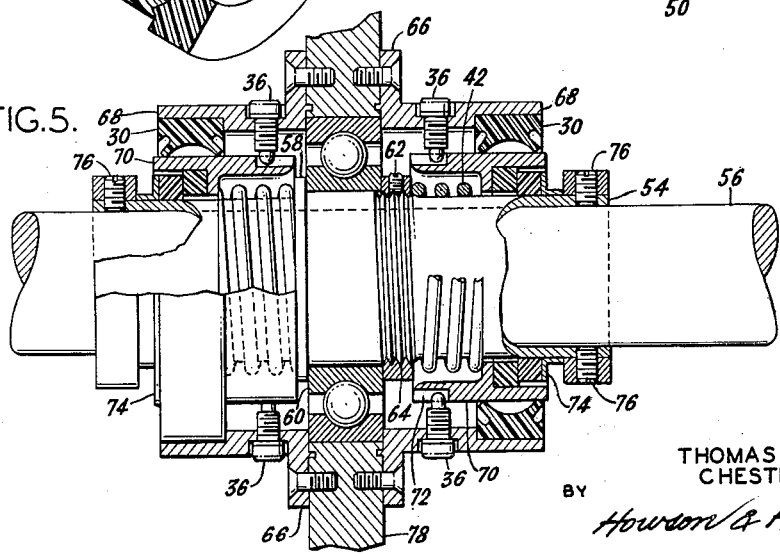
INVENTORS:
THOMAS B. BOJAKO
CHESTER K. ZELL
BY Howson & Howson
ATTYS.

United States Patent Office 3,070,378
Patented Dec. 25, 1962

3,070,378
ANTI-FRICTION ROTARY SEAL
Thomas B. Bojako, Brandamore, Pa., and Chester K. Zell, 425 Garfield Ave., Downingtown, Pa.
Filed Oct. 14, 1960, Ser. No. 62,613
5 Claims. (Cl. 277—87)

The present invention relates generally to rotary seals and more particularly to shaft seals employed to prevent leakage of fluids along rotating shafts entering fluid-filled housings or along through shafts at junctions with fluid chambers or bearings.

One object of this invention is to provide a seal of an unusually simple construction. The simplicity of the present design permits a low manufacturing cost.

An additional object is to provide a rotary seal which may be easily assembled and disassembled to allow removal of the shaft from the fluid-filled housing or to inspect the condition of the seal. Although the sealing surfaces of this invention are spring loaded, the design is such as to permit removal and replacement of the seal assembly without concern with uncontrolled spring forces.

A further object is to provide a seal requiring infrequent adjustment and little maintenance.

Another object is to provide a seal which may employ molded anti-friction materials such as nylon for coacting seal rings.

Still another object is to provide a seal having a minimum number of moving parts and only one moving contact.

The present invention, in realizing these and other objects, includes a seal housing in which is located a seal of a resilient material. In sliding contact with this seal rides a metal sleeve with an inner rib centrally apertured to pass easily over the shaft to be sealed. Set screws protruding through the seal housing coact with slots in the exterior face of the sleeve and prevent rotation of the sleeve while permitting axial motion. A sealing ring is mounted against one side of the sleeve rib with an inner diameter larger than the shaft diameter. Abutting the other side of the sleeve rib is a coil spring which is placed over the shaft and extends to an end wall of the seal housing which has been drilled to permit free passage of the shaft. In contact with the sleeve rib sealing ring is a similar sealing ring mounted on the shaft on a retainer collar.

On installation, the seal housing is bolted to a fluid-filled housing. The spring forces the two sealing rings into a tight sealing rotational contact, and no fluid can escape along the rotating shaft.

Additional objects and advantages of the invention will be more readily apparent from the following detailed discussion of embodiments thereof when taken together with the accompanying drawings in which:

FIG. 1 is a fragmentary longitudinal sectional view showing an application to a liquid-enclosing housing of a seal in accordance with the invention;

FIG. 2 is a fragmentary sectional view taken along line 2—2 of FIG. 1;

FIG. 3 is an enlarged sectional view of the mounted coacting seal rings shown in section in FIG. 1;

FIG. 4 is a perspective view, partly in section, of the coacting unmounted sealing rings shown in section in FIGS. 1 and 3; and FIG. 5 is a longitudinal sectional view of a modified embodiment of the invention showing an application of the seal to both sides of a through shaft bearing.

Referring to the drawings, FIG. 1 illustrates an embodiment in which a seal is applied to a shaft 10 which passes into a fluid-containing housing 12. The contained fluid 14, in this figure shown as a liquid although it could be a gas, has such a fluid level 16 that the shaft rotates in the fluid, necessitating a sealing device where the shaft intersects the fluid-containing housing 12 to prevent leakage at that point. The present invention provides a novel simplified seal which is contained in a cylindrical metal seal housing 18 provided with an annular flange 20 to permit a fluid-tight mounting to the fluid containing housing 12 by means of fasteners such as bolts 22. The seal housing end wall 24 is provided with opening 26 through which the shaft 10 may pass without contact. The shaft can be supported by bearings or the like, not shown, in any desired manner.

Fitted against an interior shoulder 28 of the seal housing 18 is a commercial type resilient double lip seal 30. Mounted inside this seal in slidable frictional contact therewith is a metal seal ring retainer sleeve 32 having an interior annular rib 34 dimensioned to allow free passage along the shaft 10. Extending through the seal housing 18 are diametrically opposed set screws 36 with rounded interior tips 38 which coact with slots 40 in sleeve 32 to support the sleeve in axial motion while preventing any rotational sleeve movement. Reference to FIG. 2 reveals the interaction of the screw tips and the sleeve slots.

A coil spring 42 is mounted over the shaft 10 and compressed between the seal housing end wall 24 and the sleeve rib 34. Mounted against the opposing radial face of the sleeve rib 34 is an inner seal ring 44. Coacting with this inner seal ring in sliding sealing contact therewith is a similar outer seal ring 46 which is secured to shaft 10 by a retainer 48. The inner and outer seal rings are preferably machined or molded from an anti-friction material such as nylon, polytetrafluoroethylene (trade name Teflon by E. I. du Pont de Nemours and Co., Inc.) or polytrifluorochloroethylene (trade name Kel-F by M. W. Kellogg Co., Inc.). The bearing surfaces which contact along line 50 as shown in FIGS. 1, 3 and 4 may be of any desirable coacting design although shown in the figures with a W profile to maximize the surface sealing area.

FIG. 3 indicates a manner in which the seal rings 44 and 46 may be mounted. Machine screws 52 are shown attaching outer seal ring 46 to the retainer 48 and inner seal ring 44 to the sleeve 32.

In operation, the shaft 10, retainer 48, and outer seal 46 are the only rotating members. The outer seal ring 46 is held engaged in sealing contact with the inner seal ring 44 by the axial force of the spring 42 acting through the sleeve rib 34 against the inner seal ring. Since the sleeve 32 upon which the inner seal ring is mounted is permitted to move axially along the shaft due to the sliding contact with the double lip seal 30 and the set screw tips 38, the contact pressure between the two sealing rings can be maintained despite axial movement of the shaft.

The simplicity of this seal is manifested on the drawing. As can be seen in FIGURE 1, only the seal housing 18, the sleeve 32, the sealing rings 44 and 46, and the retainer 48 need be specially manufactured for this seal. The spring, double lip seal, and fastenings are standard commercial items. The set screws 36 would require only minor alteration.

A particularly desirable characteristic of the seal is the ease with which it may be assembled or disassembled. Assuming the retainer 48 and outer seal ring 46 have been mounted on the shaft, the first step in assembly is to slip the sleeve 32 and mounted inner seal ring 44 over the shaft followed by the spring. The seal housing with double lip seal inserted and set screws raised to clear the sleeve is next placed over the shaft. The sleeve is then pressed against the spring to position the set screws over the sleeve slots. When the set screws have been screwed into place the sleeve of the seal may be released without danger of releasing the spring tension since the sleeve is held by the set screws' contact with the slot ends. To complete assembly, the seal housing, containing the spring loaded sleeve, is slid along the shaft until the flange of the housing is positioned against the fluid containing housing and the inner and outer seal rings are in contact. The seal housing flange bolts are inserted and the seal is ready for operation.

Disassembly is simply the reverse of the above. The seal housing flange bolts are removed and at once the seal ring surfaces may be inspected while the inner seal ring remains spring-loaded. Removal of the set screws then allows the sleeve and spring to slide out of the housing. The relative ease and speed with which this seal may be disassembled suggests its use with shafts which must be frequently withdrawn from the fluid-containing housing.

A modified embodiment of the invention is shown in FIG. 5 applied to the ball bearing of a through shaft. In such a case the through shaft would be passing through a fluid and thus present a problem of sealing the fluid from the bearing, and sealing the bearing lubricant from the fluid. The embodiment shown in FIG. 5 provides an effective solution to the two-fluid problem.

Two seals of the type discussed in detail above as shown in FIG. 5 placed over a through shaft in back-to-back relation enclosing a ball bearing. The seals operate basically as previously described to provide a fluid seal on each side of the bearing. A few modifications are required to adapt the seal to a through shaft application.

A bearing sleeve 54 is welded or otherwise applied to the through shaft 56. The bearing sleeve includes a shoulder 58 which provides axial contact with an inner bearing race 60. A threaded collar with set screw 62 is tightened on a threaded portion 64 of bearing sleeve 54 to engage the inner bearing race 60 in frictional contact from the other side. Tightening this threaded collar thus increases the frictional grip of the two collars 58 and 62 on the inner race and insures the rotation of the inner race, bearing sleeve and shaft as one unit supported by the balls of the bearing.

Another modification appearing in the embodiment of FIG. 5 is the location of the flanges 66 of the seal housings 68 on the spring side of the seals. The seal housings also are open ended in this embodiment to permit insertion of the resilient seal 30.

The sleeve 70 is identical with sleeve 32 except for the slots 72 which extend to the end of the sleeve. This change has no operational effect but is used because of the different method of assembly of this embodiment.

The retainers 74 are fitted tightly over the bearing sleeve and include a provision for set screws 76 which are tightened to secure the retainer to the bearing sleeve.

Other than these minor changes the seal of the modified embodiment shown in FIG. 5 is of the same structure as that shown in FIG. 1. The operation of the embodiment is the same for each of the two seals as was discussed previously for the embodiment of FIG. 1. Assembly, however, is somewhat different.

The first step in assembly, after the bearing sleeve 54 has been secured to the shaft by any suitable means and the seal housings have been attached to bearing support 78, is to insert the shaft and sleeve through the inner race 60 and tighten the collar and screw 62 to bind the sleeve bearing and shaft to the inner race. Next, taking one seal of the embodiment at a time, the set screws 36 are inserted, the seal 30 is pressed into place and the spring 42 slid over the shaft and bearing sleeve. The sleeve 70 and retainer 74 both with seal rings secured are placed over the shaft and are located in their correct positions on the bearing sleeve, their placement causing a compression of the spring. When in position, the retainer is locked to the bearing sleeve by tightening the set screws 76. Assembly of the other seal of the embodiment is accomplished in the same manner. The assembled unit is then ready for operation without further adjustment. Bearing lubricant is sealed in and exterior fluids cannot reach the bearing.

Manifestly minor changes in details of construction can be effected by those skilled in the art without departing from the spirit and the scope of the invention as defined in and limited solely by the appended claims.

We claim:

1. A fluid seal for a rotatable shaft adapted for partial insertion into a fluid-containing housing comprising a seal housing, means for attaching said seal housing to the fluid-containing housing, a stationary resilient annular seal secured to said seal housing concentric with and spaced from the shaft, a cylindrical sleeve in sealing contact with and slidably supported within said annular seal, means preventing rotation of said sleeve, an inner seal ring mounted within said sleeve, an outer seal ring mounted on the shaft in engagement with said inner seal ring, and means resiliently biasing said inner seal ring against said outer seal ring and providing a continuing sliding sealing contact therebetween.

2. A fluid seal as described in claim 1, said means for biasing said inner seal ring against said outer seal ring comprising a coil spring operatively positioned between said seal housing and said sleeve.

3. A fluid seal as described in claim 2, said inner and outer seal rings being of an anti-friction material.

4. A fluid seal for a rotatable shaft adapted for partial insertion into a fluid-containing housing comprising a flanged, cylindrical seal housing, said seal housing having an apertured end wall providing clearance for the shaft extending therethrough, a stationary resilient annular double lip seal secured to said seal housing concentric with and spaced from the shaft, a cylindrical sleeve with an interiorly extending sleeve rib of a size permitting concentric passage of the shaft, said sleeve being slidably supported within said annular double lip seal, said sleeve having longitudinal slots therein, at least one set screw in said seal housing engaging said longitudinal slots in said sleeve to prevent rotation thereof, an inner seal ring mounted in said sleeve abutting said sleeve rib, an outer seal ring mounted on the shaft in engagement with said inner seal ring, and a coil spring in compression between said seal housing and said sleeve rib resiliently biasing said inner seal ring against said outer seal ring and providing a continuing sliding sealing contact therebetween.

5. A fluid seal as described in claim 4, said inner and outer seal rings being of an anti-friction material.

References Cited in the file of this patent

UNITED STATES PATENTS

| 1,926,006 | Kohler | Sept. 5, 1933 |
| 2,049,955 | Gilbert | Aug. 4, 1936 |
| 2,215,034 | Gorman | Sept. 17, 1940 |
| 2,220,771 | McHugh | Nov. 5, 1940 |
| 2,233,557 | Shager | Mar. 4, 1941 |
| 2,419,588 | Pasco | Apr. 29, 1947 |
| 2,516,191 | Englesson | July 25, 1950 |
| 2,844,393 | Jensen | July 22, 1958 |